US010154200B2

(12) United States Patent
Rycenga et al.

(10) Patent No.: US 10,154,200 B2
(45) Date of Patent: Dec. 11, 2018

(54) IMAGER WITH ACTIVE EXPOSURE CORRECTION

(71) Applicant: Gentex Corporation, Zeeland, MI (US)

(72) Inventors: Brock R. Rycenga, Wyoming, MI (US); Benjamin B. Hilldore, Holland, MI (US); Barry K. Nelson, Howard City, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/599,499

(22) Filed: May 19, 2017

(65) Prior Publication Data

US 2017/0339326 A1 Nov. 23, 2017

Related U.S. Application Data

(60) Provisional application No. 62/339,475, filed on May 20, 2016.

(51) Int. Cl.
*H04N 5/235* (2006.01)
*G02F 1/163* (2006.01)
(Continued)

(52) U.S. Cl.
CPC ........... *H04N 5/2353* (2013.01); *B60R 11/04* (2013.01); *G02F 1/163* (2013.01); *G03B 7/097* (2013.01);
(Continued)

(58) Field of Classification Search
CPC .. H04N 5/2353; H04N 5/2351; H04N 5/2357; B60R 11/04; G02F 1/163; G03B 7/097
(Continued)

(56) References Cited

U.S. PATENT DOCUMENTS 4,902,108 A 2/1990 Byker
5,202,787 A 4/1993 Byker et al.
(Continued)

FOREIGN PATENT DOCUMENTS

WO 2015141860 A1 9/2015

OTHER PUBLICATIONS

International Search Report and Written Opinion of the International Searching Authority, or the Declaration, dated Sep. 7, 2017, for International Application No. PCT/US2017/033484, filed May 19, 2017, 9 pages.

*Primary Examiner* — Nhan T Tran
(74) *Attorney, Agent, or Firm* — Price Heneveld LLP; Bradley D. Johnson

(57) ABSTRACT

An imager module for a vehicle is disclosed. The imager module comprises an imager configured to capture image data over a plurality of image frames based on incoming light in a field of view and an optic device configured to control a transmission of the incoming light. The module comprises a controller configured to identify an exposure time for the imager based on environmental lighting conditions and adjust the exposure time by a flicker mitigation period. The adjustment of the exposure time mitigates an appearance of a periodic light source in the image data. The controller is further configured to control the transmission of the optic device to control the transmission of the incoming light.

19 Claims, 6 Drawing Sheets

(51) Int. Cl.
*B60R 11/04* (2006.01)
*G03B 7/097* (2006.01)
*G03B 9/02* (2006.01)
*G03B 11/00* (2006.01)

(52) U.S. Cl.
CPC ............... *G03B 9/02* (2013.01); *G03B 11/00* (2013.01); *H04N 5/2351* (2013.01); *H04N 5/2357* (2013.01)

(58) Field of Classification Search
USPC ...................................... 348/229.1
See application file for complete search history.

(56) References Cited

U.S. PATENT DOCUMENTS

| | | |
|---|---|---|
| 5,278,693 A | 1/1994 | Theiste et al. |
| 5,280,380 A | 1/1994 | Byker |
| 5,336,448 A | 8/1994 | Byker |
| 5,451,822 A | 9/1995 | Bechtel et al. |
| 6,509,832 B1 | 1/2003 | Bauer et al. |
| 8,170,286 B2 | 5/2012 | Kashimura et al. |
| 2002/0097324 A1* | 7/2002 | Onuki ............... H04N 5/2259 348/208.99 |
| 2015/0281547 A1* | 10/2015 | Terasawa ............. H04N 5/2357 348/226.1 |
| 2017/0041591 A1* | 2/2017 | Korogi ................ H04N 5/2357 |

* cited by examiner

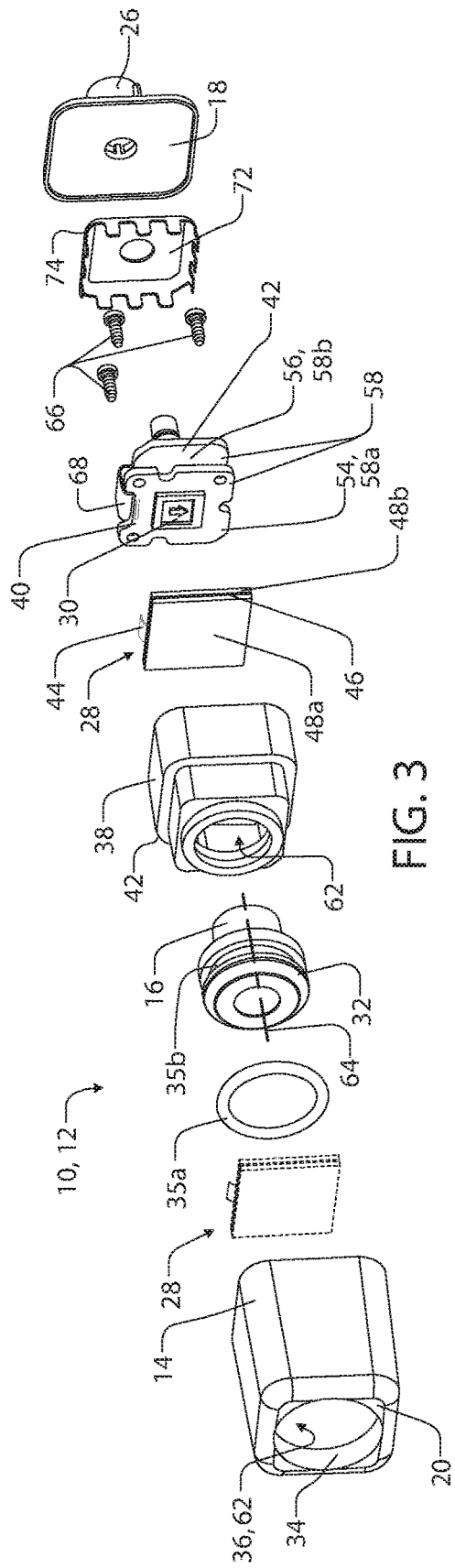
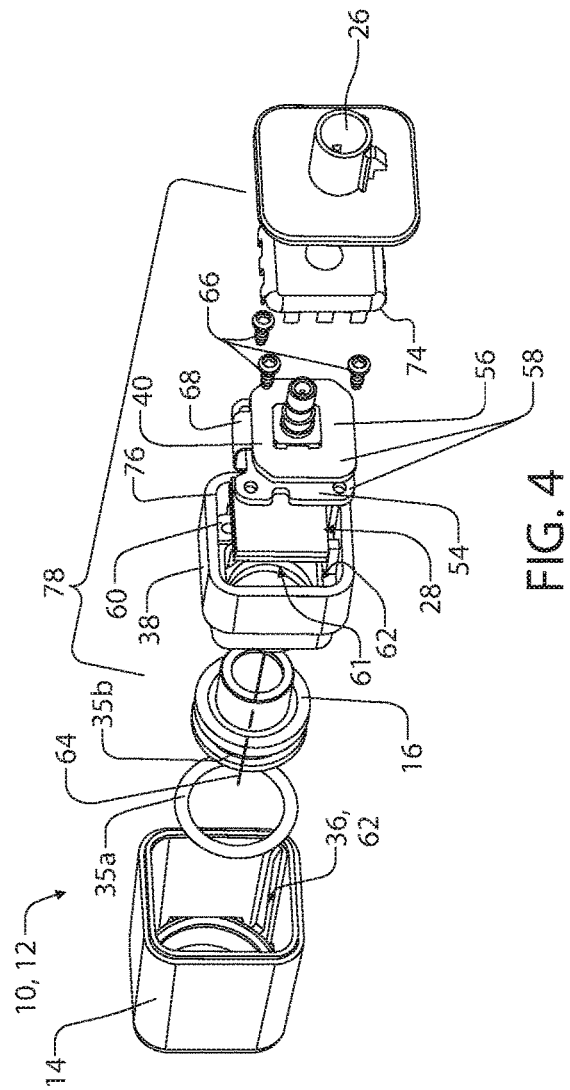
FIG. 3
FIG. 4

US 10,154,200 B2

IMAGER WITH ACTIVE EXPOSURE CORRECTION

CROSS REFERENCE TO RELATED APPLICATION

This application claims priority to and the benefit under 35 U.S.C. § 119(e) of U.S. Provisional Patent Application No. 62/339,475, filed on May 20, 2016, entitled "IMAGER WITH ACTIVE EXPOSURE CORRECTION," the entire disclosure of which is hereby incorporated herein by reference.

TECHNOLOGICAL FIELD

The present invention generally relates to an imager module and, more particularly, relates to an imager module configured to control a transmission of entering light.

SUMMARY OF THE INVENTION

In one aspect of the disclosure, an imager module for a vehicle is disclosed. The imager module comprises an imager configured to capture image data over a plurality of image frames based on incoming light in a field of view and an optic device configured to control a transmission of the incoming light. The module comprises a controller configured to identify an exposure time for the imager based on environmental lighting conditions and adjust the exposure time by a flicker mitigation period. The flicker mitigation period may correspond to an exposure adjustment period. The flicker mitigation period may be applied by the controller as an increase or decrease of the exposure time identified based on the environmental lighting conditions. The adjustment of the exposure time mitigates an appearance of a periodic light source in the image data. The controller is further configured to control the transmission of the optic device to control the transmission of the incoming light.

In another aspect of the disclosure, an imager module for a vehicle is disclosed. The module comprises an imager configured to capture image data over a plurality of image frames based on incoming light in a field of view. The module further comprises an electro-optic device configured to vary in transmittance controlling a transmission of the incoming light into the imager and a controller in communication with the imager and the optic device. The controller is configured to identify an exposure time for the imager based on environmental lighting conditions in the field of view and control the exposure time based on the environmental lighting conditions. The controller is further configured to limit the exposure time to a minimum exposure based on a frequency threshold and control the transmission of the electro-optic device controlling the transmission of the incoming light.

In yet another aspect of the disclosure, a method for capturing image data for a vehicle imaging system is disclosed. The method comprises capturing image data in a field of view of an imager and identifying an exposure time for the imager based on an environmental lighting condition in the field of view. The method further comprises controlling a transmission of an electro-optic device controlling a transmission of the environmental light transmitted through the electro-optic device and extending the exposure time by controlling the transmission.

These and other features, advantages, and objects of the present invention will be further understood and appreciated by those skilled in the art by reference to the following specification, claims, and appended drawings.

BRIEF DESCRIPTION OF THE DRAWINGS

FIG. 3 is an exploded assembly view of an imager module of the present disclosure;

FIG. 4 is an exploded assembly view of an imager module of the present disclosure;

DETAILED DESCRIPTION OF EMBODIMENTS

Figure 1:
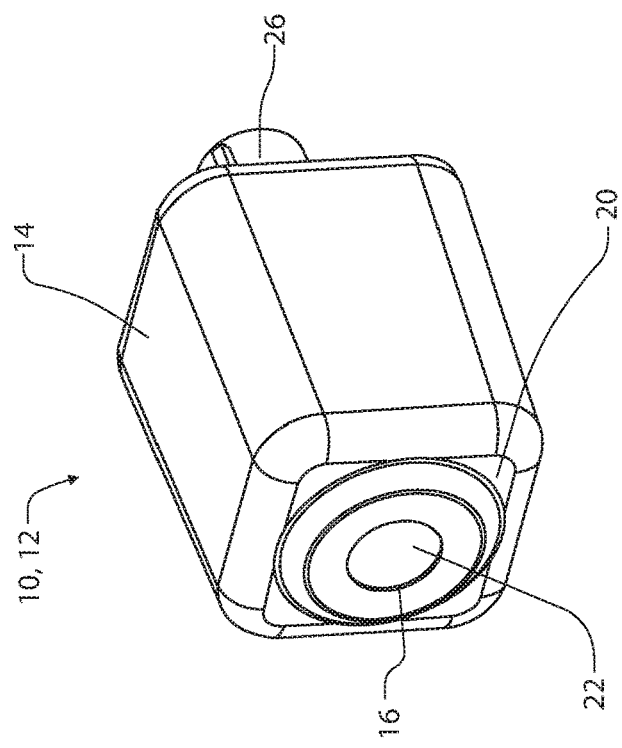
FIG. 1 is a front perspective view of an imager module of the present disclosure.

For purposes of description herein, the terms "upper," "lower," "right," "left," "rear," "front," "vertical," "horizontal," and derivatives thereof shall relate to the invention as oriented in FIG. 1. Unless stated otherwise, the term "front" shall refer to the surface of the element closer to an intended viewer of the display mirror, and the term "rear" shall refer to the surface of the element further from the intended viewer of the display mirror. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 2:
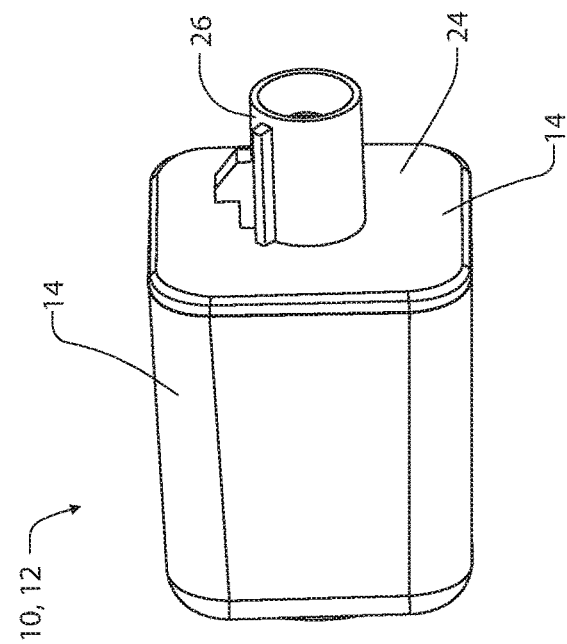
FIG. 2 is a rear perspective view of an imager module of the present disclosure.

Referring to FIGS. 1-2, perspective views of an imager module 10 are shown. The imager module 10 may be configured for use with a vehicle. As demonstrated in FIGS. 1-4, the imager module 10 may correspond to an imager assembly 12 comprising a housing 14 configured to at least partially enclose a lens 16. In some embodiments, the imager assembly 12 may form a sealed assembly with the lens 16 and a lid 18. As described herein, a front surface 20 may correspond to a surface of the housing 14 through which the lens 16 protrudes to form an optic surface 22. A rear surface 24 of the imager assembly 12 may correspond to an outer surface of the lid 18, which may form an imager connector 26. The imager connector 26 may be configured to communicatively connect the imager module 10 to one or more systems of the vehicle.

As discussed herein, the imager assembly 12 may provide for the imager module 10 to be coupled to or otherwise incorporated in one or more panels or features of a vehicle. In some embodiments, the imager connector 26 may provide for the imager module 10 to be incorporated in such panels of the vehicle while providing for the communicative connection of the imager module 10 to one or more systems of the vehicle. The various embodiments of the imager module 10 as described herein may provide for a flexible solution to implement the imager module 10 in various portions of the vehicle.

As demonstrated in reference to FIGS. 3 and 4, in an exemplary embodiment, the imager module 10 may comprise an optic device 28 configured to control the transmission of light from the environment proximate the imager module 10 into at least one photoreceptor or pixel array 30 of the imager module 10. The optic device 28 may correspond to an electro-optic device, which may be configured to control a transmittance of light through an electrochromic medium. In such embodiments, the optic device 28 may be configured to change in transmittance as a function of changes in light absorption of an electrochromic medium incorporated therein. The light absorption of the electrochromic medium may be controlled in response to the application of electrical potential to the electrochromic medium.

In some embodiments, the optic device 28 may correspond to various elements configured to adjust the transmission of light therethrough. For example, in some embodiments imager module 10 may comprise a light adaptive lens that may be configured to limit light entering the pixel array 30. Such a lens or optic device may correspond to various forms of optic devices, for example, an electrochromic element, photochromic element, and/or other devices configured to vary a transmission of light therethrough. In an exemplary embodiment, the optic device 28 may correspond to a chroma neutral electrochromic device configured to limit light transmission in the pixel array without altering the chroma information of the image data.

According to various embodiments of the disclosure, the optic device 28 may be configured to limit the transmittance of light to the pixel array 30 during conditions having substantial environmental light. For example, typically bright environmental lighting conditions require low exposure times to prevent image saturation. By limiting the light entering the pixel array 30, the optic device 28 may allow the exposure time for one or more of the pixels to be increased while preventing saturation of one or more of the pixels during an exposure time. In this configuration, the optic device 28 may be configured to decrease an amount or intensity of light received by the pixel array 30 during bright lighting conditions such that a controller of the pixel array 30 may lengthen an exposure time of one or more of the pixels of the pixel array 30 without saturating the pixel data.

In some embodiments, the optic device 28 may be controlled by a controller configured to selectively limit light entering the pixel array 30. By controlling the transmittance of the optic device 28, the controller may prevent excess light entering the pixel array 30 for a particular exposure time to preserve the integrity of image data. If the excess light was not limited by the optic device 28, the integrity of image data may be diminished due to the light received by the pixel array 30 exceeding an intensity for a specific exposure time or setting. By selectively limiting the light received by the pixel array 30, the imager module 10 may extend an exposure time of the pixel array 30 to collect image data that may be periodic or image data that changes over a temporal period.

The image data that is periodic may correspond to periodic components of an image scene including flickering light sources, light sources that change intensity over time, and/or light sources that are activated over a periodic duty cycle. Accordingly, the controller of the imager module 10 may be configured to extend an exposure time to limit fluctuation in the image data that may otherwise be apparent when capturing image data associated with one or more periodic elements. In this way, the imager module 10 may prevent or mitigate irregularities or fluctuations in the image data associated with the periodic light sources.

In an exemplary embodiment, during bright light conditions, the controller may control the transmittance of the optic device 28 to limit an exposure of the pixel array 30 to environmental light to prevent saturation of one or more of the pixels of the pixel array 30. In this configuration, the imager module 10 may be configured to extend an exposure of one or more pixels of the pixel array 30 to limit the appearance of variations in the image data associated with periodic components of the image scene while preventing saturation of one or more of the pixels. To more clearly explain, without the optic device 28, excess light entering the pixel array 30 during the extended exposure time may lead to the saturation or over-exposure of the pixels and diminished image quality. Further details regarding the periodic components, image data, and various corresponding imaging control schemes are discussed in reference to FIGS. 5, 6, and 7.

Devices having variable transmittance to radiation, which may comprise electrochromic materials are described, for example, by U.S. Pat. No. 4,902,108, entitled "SINGLE-COMPARTMENT, SELF-ERASING, SOLUTION-PHASE ELECTROCHROMIC DEVICES SOLUTIONS FOR USE THEREIN, AND USES THEREOF," issued Feb. 20, 1990, to H. J. Byker; U.S. Pat. No. 5,202,787, entitled "ELECTRO-OPTIC DEVICE," issued Apr. 13, 1993, to H. J. Byker et al.; U.S. Pat. No. 5,278,693, entitled "TINTED SOLUTION-PHASE ELECTROCHROMIC MIRRORS," issued Jan. 11, 1994, to D. A. Theiste et al.; U.S. Pat. No. 5,280,380, entitled "UV-STABILIZED COMPOSITIONS AND METHODS," issued Jan. 18, 1994, to H. J. Byker; U.S. Pat. No. 5,336,448, entitled "ELECTROCHROMIC DEVICES WITH BIPYRIDINIUM SALT SOLUTIONS," issued Aug. 9, 1994, to H. J. Byker; and U.S. Pat. No. 5,451,822, entitled "ELECTRONIC CONTROL SYSTEM," issued Sep. 19, 1995, to J. H. Bechtel et al. Each of these patents is commonly assigned with the present invention and the disclosure of each, including the references contained therein, is being incorporated herein by reference in its entirety. Such electrochromic devices may be utilized to provide for variable transmittance elements such as variable transmittance windows, the optic device 28, etc.

Still referring to FIGS. 3-4, exploded views of the imager assembly 12 are shown. In an exemplary embodiment, the lens 16 may form a cylindrical profile 32 configured to engage a cylindrical opening 34 formed in the housing 14. In this configuration, the housing 14 may be configured to receive the lens 16 and form a sealed enclosure for the imager module 10. A seal 35a may be disposed between the housing 14 and the cylindrical opening 34 in an annular groove 35b formed in the profile 32 of the lens 16. In this configuration, the housing 14 may provide for an aesthetic cover configured to form a first cavity 36. The first cavity 36 that may enclose one or more elements of the imager assembly 12.

In an exemplary embodiment, a lens holder 38 may be configured to receive the lens 16. The lens holder 38 may further be configured to receive the optic device 28. In this configuration, the optic device 28 may be disposed between the lens 16 and an imager circuit 40. The imager circuit 40 may comprise one or more circuits in communication with the optic device 28. In an exemplary embodiment, the optic device 28 may be in communication with a controller 42, which may correspond to a portion of the imager circuit 40 and/or may be in communication with the imager circuit 40. In this configuration, the controller 42 may be configured to receive image data including the exposure data for the pixel array 30 and adjust the transmittance of the optic device 28 in response to the exposure. In this way, the controller 42 may extend the exposure time of the pixels in the pixel array 30 while preventing saturation of the image data from the pixel array 30.

As discussed herein, the optic device 28 may correspond to an electro-optic device configured to change light transmission properties in response to a control signal (e.g. an electrical potential) received from the controller 42. The controller 42 may be in communication with the optic device via a first conductive connector 44. The conductive connector 44 may be configured to deliver the control signal to an electrochromic medium 46 disposed between a first substrate 48a and a second substrate 48b. The substrates may correspond to glass, plastic, or various forms of substantially light transmissive substrates. In this configuration, the controller 42 may selectively apply the electrical potential to the electrochromic medium 46 to darken the optic device 28 such that a controlled portion of light entering the lens 16 is absorbed. Additionally, when the potential or voltage is decreased, the optic device 28 may transition back to a highly light transmissive state or clear state.

In some embodiments, the optic device 28 may be disposed in front of the lens 16. In this configuration, the controller 42 may be configured to decrease a transmittance of the optic device 28 to limit the light from entering the lens 16. By limiting the light that enters the lens 16, the controller 42 may consequently limit the light entering the pixel array 30. In this way, the controller 42 may increase an exposure time of one or more pixels in the pixel array 30 to limit a flicker or inconsistency of a periodic light source while preventing the pixels of the pixel array 30 from saturating due to excessive light entering the lens 16. Accordingly, the disclosed imager module 10 may be configured to suit a variety of applications without departing from the spirit of the disclosure.

The imager circuit 40 may correspond to one or more printed circuit boards (PCBs) 58. The one or more PCBs 58 of the imager circuit 40 may correspond to a plurality of PCBs 58 comprising an imager 54 including the pixel array 30 and one or more control circuits 56 (e.g. the controller 42). The imager 54 may correspond to any form of light receiving circuitry, and in an exemplary embodiment, may correspond to a charged coupled device (CCD), a complimentary metal-oxide semiconductor (CMOS) image sensor, or other suitable imaging devices in accordance with the disclosure. In the various embodiments, the control circuit 56 and the imager 54 may be configured as a plurality of printed circuit boards, which may be arranged in a stacked parallel configuration, a perpendicular arrangement, or any combination thereof.

The lens holder 38 may be configured to receive the one or more PCBs 58 of the imager circuit 40. In an exemplary embodiment, the lens holder 38 may form a mounting surface 60 formed by a second cavity 61. In some embodiments, the second cavity 61 may correspond to a shielded cavity 62 formed by the lens holder 38. The mounting surface 60 may extend parallel to a longitudinal axis 64 of the lens 16. The one or more PCBs 58 may be mounted to the mounting surface 60 by various attaching features (e.g. one or more fasteners 66). In this configuration, the lens holder 38 may be configured to receive and substantially enclose the one or more PCBs 58 in the shielded cavity 62.

In some embodiments, the one or more printed circuit boards PCBs 58 may correspond to a first PCB 58a and a second PCB 58b. The first PCB 58a may be mounted to the lens holder 38 on the mounting surface 60 via the fasteners 66. In this configuration, the lens holder 38 may align the imager 54 with the lens 16. The second PCB 58b may be connected to the first PCB 58a via a second conductive connector 68. The conductive connector 68 may correspond to a ribbon cable or various forms of conductive connections. The second PCB 58b may be received by the lens holder 38 and may be retained in an assembled configuration by a rear shield 72 and/or the lid 18 of the housing 14.

As discussed herein, various components of the imager assembly 12 may be enclosed inside the shielded cavity 62 of the housing 14. The rear shield 72 may be configured to enclose the shielded cavity 62. Similar to the lens holder 38, the rear shield 72 may be of a conductive material configured to prevent electromagnetic interference EMI from entering the shielded cavity 62. The rear shield 72 may form a second exterior profile 74 configured to substantially align with an interior profile 76 formed by the shielded cavity 62 of the lens holder 38. In this configuration, the lens 16, lens holder 38, and the rear shield 72 may substantially enclose the imager circuit 40 to form a shielded subassembly 78 of the imager module 10.

Figure 5:
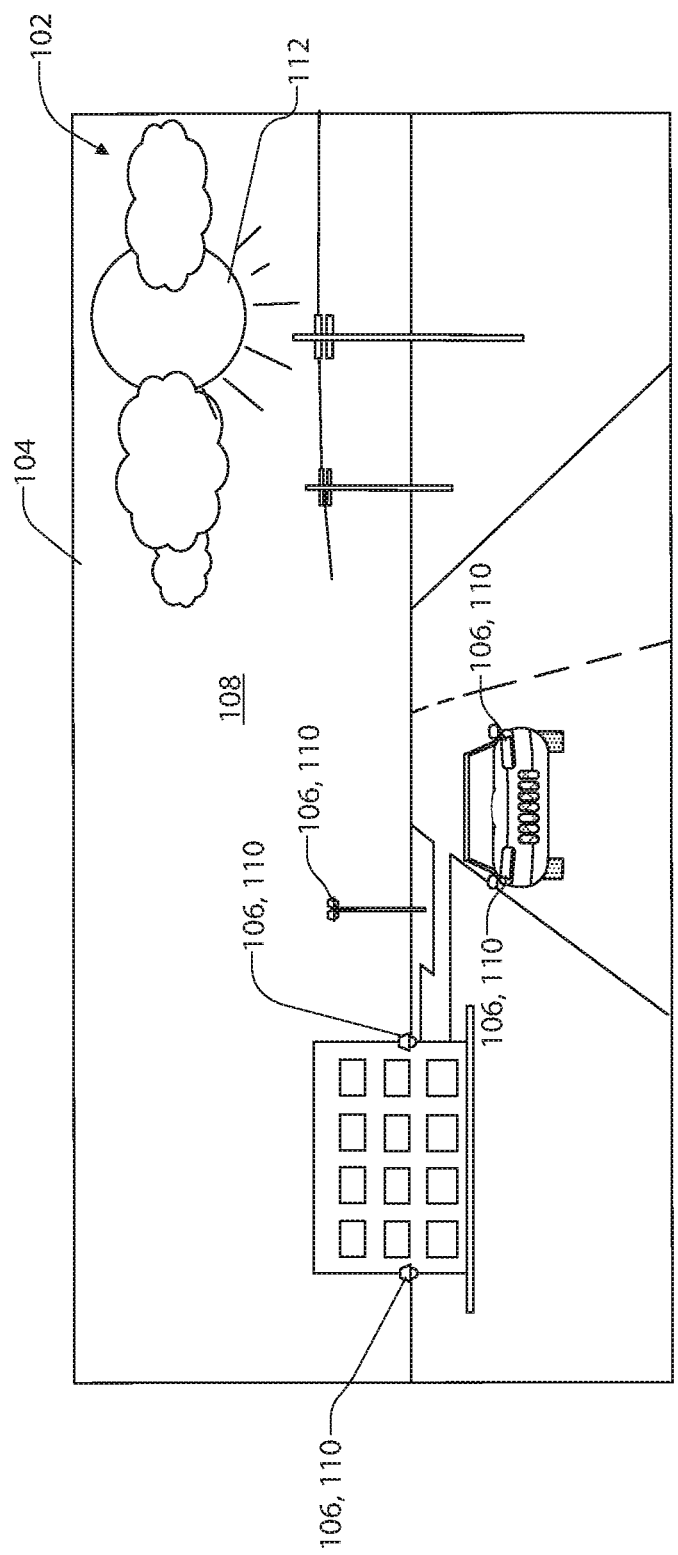
FIG. 5 is an environmental view of image data corresponding to a scene captured by an imager module of the present disclosure.

Referring now to FIG. 5, image data 102 is demonstrated in an exemplary image frame 104. The imager module 10 may be configured to capture the image data 102 via the pixel array 30 in communication with the imager circuit 40. As will be discussed in further detail in reference to FIG. 7, in some embodiments, the controller 42 may be configured to control the pixel array 30 to capture the image data 102 and identify at least one flickering or periodic light source 106. In response to identifying a flickering or periodic light source 106, the controller 42 may be configured to adjust exposure times of sensors (pixels) of the pixel array 30 of one or more frames of a series of image frames. In this way, the controller 42 may extend the exposure time of the pixels to mitigate variations in the image data 102 due to the periodic light source 106.

In some embodiments, the control the may adjust or extend the exposure time such that the exposure overlaps at least a portion of a period of the periodic light source 106. In some embodiments an exposure time of the pixels of the pixel array 30 may be limited by a frame rate at which the pixel array 30 is capturing consecutive frames of image data 102. For example, at a frame rate of 60 frames per second, a maximum exposure time may be limited to approximately 16.6 msec. due to the frame rate. The controller 42 may maintain a maximum exposure time of one or more pixels of the pixel array 30 and limit light entering the pixel array 30 by controlling the transmittance of the optic device 28. In this way, the imager module 10 may mitigate the appearance of the periodic light sources 106 without causing the image data 102 to saturate.

In some embodiments, the controller 42 may be configured to maintain an exposure time of the pixel array 30 to meet a minimum exposure time to limit the appearance of periodic light sources 106 in the image data 102. For example, if the periodic light source 106 has a frequency of 100 Hz, the controller 42 may be configured to maintain a minimum exposure time of the pixel array 30 to meet or exceed an activation period of the periodic light source 106. More specifically, if the frequency is 100 Hz, the controller 42 may maintain a minimum exposure time of each image frame to meet or exceed 10 msec. In this particular example, 10 msec. corresponds to the period of the 100 Hz frequency. Further details regarding an exposure time determined based on environmental conditions and various adjustments of such an exposure time to limit or mitigate the appearance of variations due periodic light sources are discussed in reference to FIG. 6.

While maintaining the minimum exposure time, the controller 42 may control the transmittance of the optic device 28 to limit light entering the pixel array 30 from exceeding a saturation threshold. In this way, the controller 42 may extend the exposure time or maintain the minimum exposure time of the image frames during bright light conditions to limit the appearance of the periodic light sources 106 in the image data. During low environmental lighting conditions, the exposure of the pixel array may be increased significantly without obscuring the image data due to saturation of the pixels of the image data. However, in bright lighting conditions, increasing the exposure may have undesirable effects on the exposure of the image frame 104.

For example, in bright lighting conditions similar to those shown in FIG. 5, the controller 42 may be operable to control the optic device 28 to limit the light received by the pixel array 30. For example, in conditions having substantial environmental light, the controller 42 may maintain a minimum exposure time to limit the appearance of one or more of the periodic light source 106 in the image data 102 as demonstrated in the image frame 104. In some embodiments, the controller 42 may also be operable to identify or detect the periodic light sources 106 as one or more portions 108 having a varying intensity (e.g. varying luminance values) over a series of consecutive image frames captured by the pixel array 30. Upon identification of the periodic light source 106, the controller may extend the exposure time and control the transmittance of the optic device 28 to limit the intensity of light entering the pixel array 30 and mitigate the appearance of the periodic light sources 106 in the image data 102.

The periodic light sources 106 may correspond to various forms of light sources. For example, the light sources 106 may correspond to headlights, taillight, turn indicators, street lights, light sources from residences and business, some of which are demonstrated in FIG. 5. A typical light source 106 that may have a periodic illumination may correspond to a light emitting diode (LED) source or a solid state lighting source. The periodicity or frequency of the light sources 106 may vary widely from approximately 30 Hz to 500 Hz and may correspond to almost any operational frequency that may be viable for a light source. Accordingly, the imager module 10 may be operable to maintain a minimum exposure of the pixel array 30 to eliminate or minimize a flicker of the periodic light sources 106 from being apparent in the image data 102.

The sun 112 is demonstrated in FIG. 5 as a bright environmental light source 110. However, environmental light sources may correspond to any form of light source that may be apparent in the environment of a scene captured in the image data 102. For example, the environmental light source may correspond to commercial or residential light sources 106. According to the various embodiments, the disclosure may provide for the mitigation of a flickering and/or various inconsistencies in the image data 102 that may be caused by the periodic light sources 106.

Figure 6:
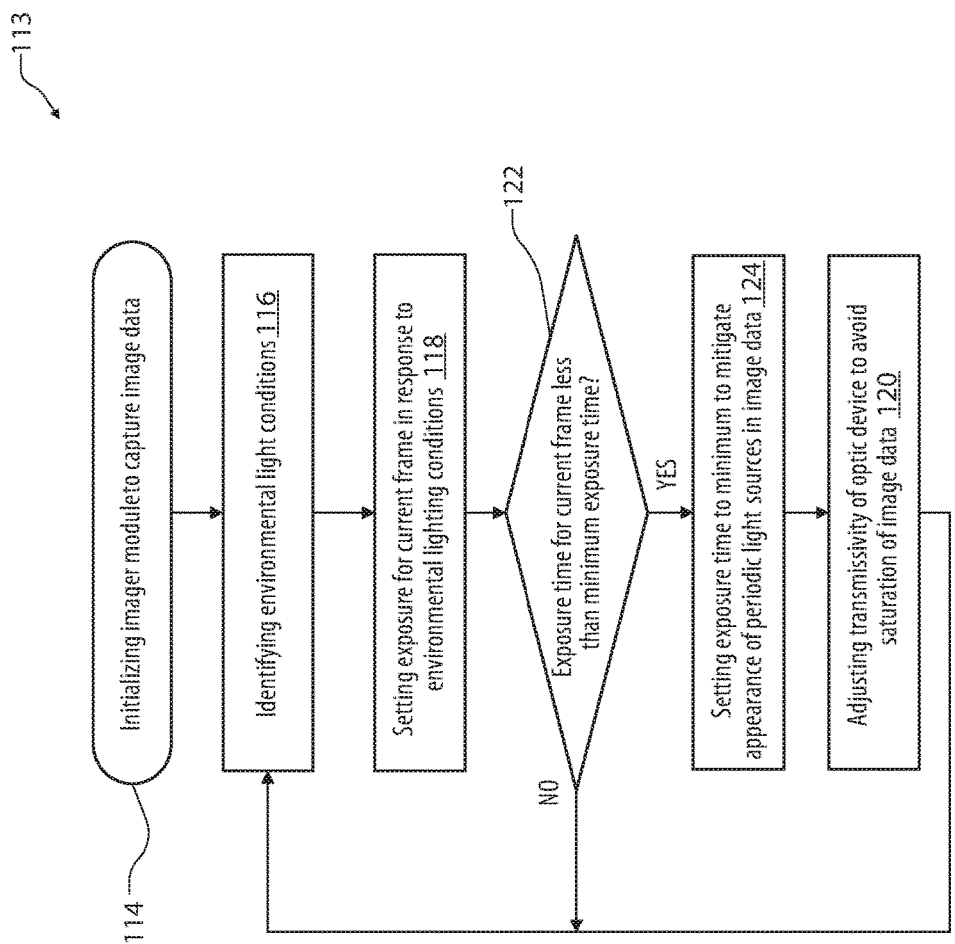
FIG. 6 is a flow chart of a method for mitigating the appearance of a periodic light source in image data.

Referring now to FIGS. 5 and 6, a method 113 for capturing image data during diverse environmental lighting conditions is disclosed. The method 113 may begin by initializing the imager module 10 to capture the image data 102 (114). Upon capturing a sample of the image data 102, the controller 42 may identify environmental lighting conditions for a scene captured by the pixel array 30 (116). Based on the environmental lighting conditions, the controller 42 may set the exposure of the imager 54 (118). The exposure setting of the pixel array 30 may be maintained by the controller 42 at a minimum exposure time to mitigate the appearance of periodic light sources in the image data 102. The minimum exposure time may correspond to a predetermined exposure time that may be identified in a lookup table stored in memory and/or calculated based on the lighting conditions.

Upon setting the exposure time, the controller 42 may further control the transmittance to the optic device 28 to limit the light entering the pixel array 30 (120). In this way, the controller 42 may prevent the image data from becoming saturated due to overexposure. In some embodiments, the exposure time for the pixel array 30 may be controlled based on a frame rate at which the frames 104 of the image data 102 are captured by the imager module 10. For example, at a frame rate of 100 frames per second, a maximum exposure time may be limited to approximately 10 msec. Accordingly, the controller 42 may be configured to maintain the exposure time to be extended to a maximum allowable time based on the frame rate of the frames 104. In order to prevent saturation due to overexposure at the maximum allowable time, the controller may limit the light entering the pixel array 30 via the optic device 28 to prevent saturation of the image data 102. In this way a maximum length of the exposure time may be maintained for a desired frame rate while controlling the amount of light received in each image frame to optimize exposure and prevent saturation of the image data 102.

Depending on the particular control scheme, the controller 42 may be configured to extend the exposure time of the pixels array 30 based on environmental lighting conditions and a selected transmittance of the optic device 28. In various embodiments, the controller 42 may be configured to extend the exposure time of one or more pixels in the pixel array 30 commensurate (e.g. to a similar degree or proportionate) to the light that is absorbed by the optic device 28. For example, if the exposure time is increased by 25% from a setting determined based on environmental lighting conditions, the controller 42 may decrease the transmittance by 20% to achieve a consistent sensitivity of the pixel array 30. In this way, the appearance of a periodic light source 106 in the image data 102 may be limited without having a substantial effect on the resulting image data 102.

For example, in some embodiments, the controller 42 may be configured to adjust the exposure time of the exposure time of the pixels array 30 from the exposure time calculated based on environmental conditions (e.g. ambient light). The adjustment of the exposure may be processed by the controller in order to mitigate an appearance of a periodic light source identified in the image data. The adjustment of the exposure time comprises extending the exposure time by a flicker mitigation period or exposure adjustment period. The flicker mitigation period may be applied by the controller 42 as a temporal increase or decrease of the exposure time identified based on the environmental lighting conditions. In this way, the imager module 10 may reduce or mitigate the appearance of the periodic light source in the image data.

Additionally, the controller 42 may control the incoming light with the optic device 28 commensurate to a ratio of the flicker mitigation period to the exposure time originally calculated based on the environmental light. In this configuration, the controller 42 may be configured to mitigate the variation in the periodic light source in the image data by increasing the exposure time of one or more pixels of the imager. The increased exposure time may allow the pixels of the pixels array 30 to limit a flickering of the periodic light source 106 by capturing an increased portion of a plurality of active temporal periods or portions of the periodic light source relative to the exposure identified based on the environmental lighting conditions.

In some embodiments, the controller 42 may compare the exposure time for a current image frame to the minimum exposure time (122). If the exposure time for the current image frame is less than the minimum exposure time, the controller 42 may set the exposure time to the minimum to mitigate appearance of the periodic light sources 106 in image data 102. The minimum exposure time may be a predetermined value and may correspond to a time determined to be effective to mitigate an appearance of periodic light sources 106 having a particular frequency based on test results. The controller 42 may then control the transmittance to the optic device 28 to limit a transmittance of the light entering the pixel array 30 to optimize an exposure of the pixel array 30 and prevent saturation of the image data 102 as in step 120. In this way, the controller 42 may limit an appearance of the periodic light sources 106 in the image data 102 by extending the exposure time beyond an exposure time that may be applied by conventional image sensors based on environmental lighting conditions.

Figure 7:
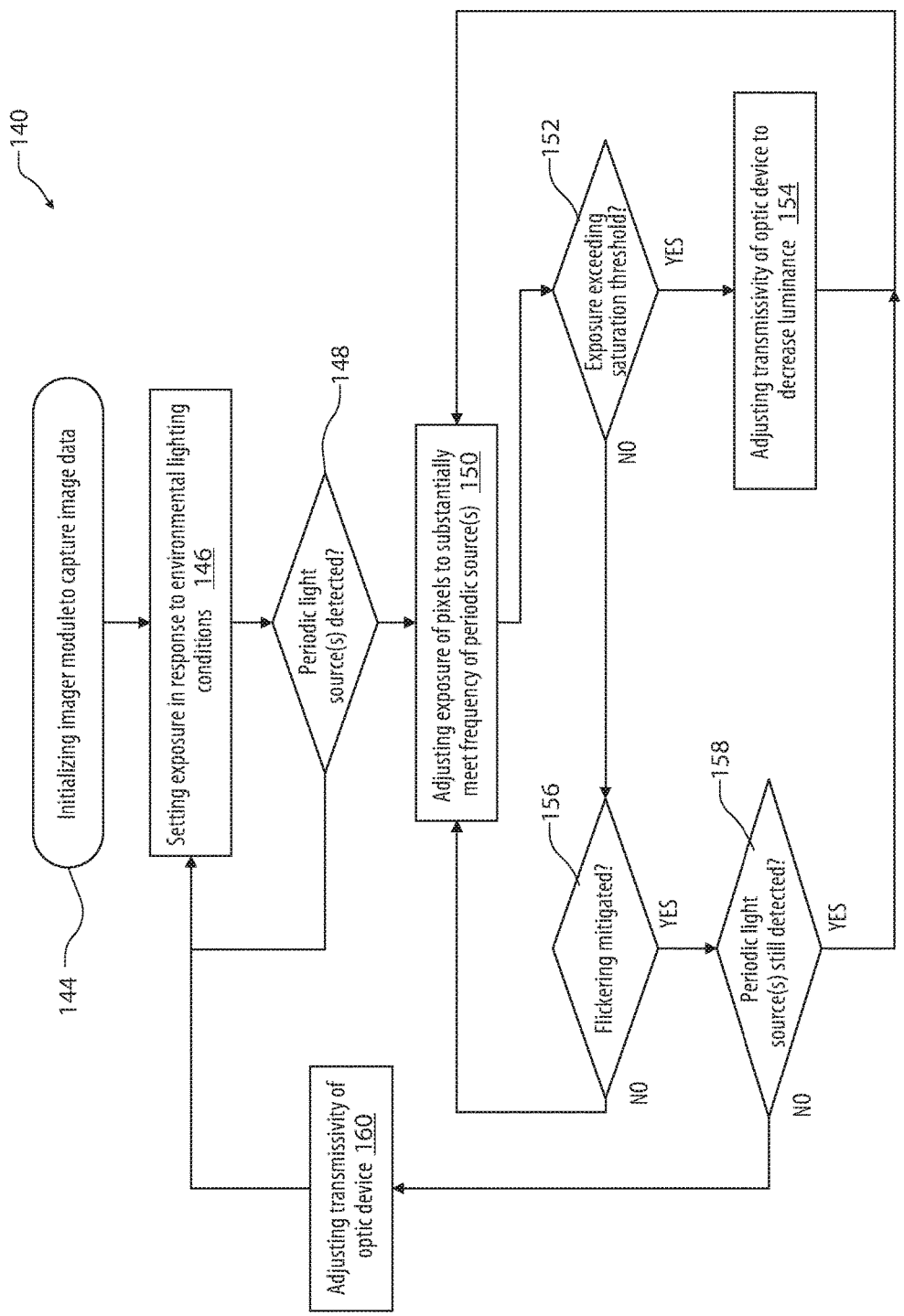
FIG. 7 is a flow chart of a method for detecting and mitigating the appearance of a periodic light source.

Referring now to FIGS. 5 and 7, a method 140 for capturing image data during diverse environmental lighting conditions is disclosed. The method 140 may begin by initializing the imager module 10 to capture the image data 102 (144). Upon capturing a sample of the image data 102, the controller 42 may set the exposure of the imager 54 based on environmental lighting conditions identified from the image data 102 (146). Next, the controller 42 may compare the image data over a plurality of frames 104 to determine if one or more periodic light sources 106 are detected (148).

As discussed herein, one or more periodic light sources 106 may be identified in the image data 102 as flickering or temporally intermittent portions or pixels of a plurality of the image frames 104. For example, the periodic light sources 106 may be identified by the controller 42 as one or more portions 108 having a varying intensity (e.g., varying luminance values) over a series of consecutive image frames 104 captured by the pixel array 30. This varying intensity could negatively affect the appearance and accuracy of an appearance of the light sources 106 in the image data 102. The varying intensity may also cause distractions to an operator of the vehicle. Accordingly, the periodic light sources 106 may result in diminished accuracy of the image data and create a distraction for the operator of the vehicle if displayed on a display device.

If a periodic light source 106 is not detected in step 148, the controller 42 may continue to determine the exposure of the image data 102 based on environmental lighting conditions as in step 146. If a periodic light source 106 is detected in step 148, the controller 42 may adjust the exposure of one or more pixels in the pixel array 30 such that exposure time extends substantially co-extensive with a period of a frequency of the periodic light source 106 (150). For example, the controller 42 may extend the exposure such that it overlaps with a period of the periodic light source in each image frame 104. As used in relation to the exposure time of the imager 54, the term substantially may correspond to a duration for the exposure required to mitigate a flickering or variation in luminance of the periodic light source 106 below a luminance variation threshold. The luminance variation threshold may correspond to a predetermined value of a change in luminance for each periodic light source and may correspond to a variety of predetermined values that may be dependent on a brightness of an environmental lighting condition. In this way, the controller 42 may substantially mitigate the flickering or variable luminance of one or more periodic light sources 106 such that the flickering or variation of the light sources 106 is not visibly apparent in the image data 102.

In some circumstances, particularly corresponding to bright environmental lighting conditions, the adjustment of the exposure in step 150 may lead to one or more pixels of the pixel array 30 approaching a saturation level. In order to prevent saturation of the pixels that may diminish the utility of the image data 102, the controller 42 may determine if the exposure of one or more of the pixels exceeds a saturation threshold (152). The saturation threshold may vary depending on a particular application of the imager module 10 and may correspond to an average luminance value of one or more pixels over a plurality of the image frames 104. If the saturation threshold is exceeded, the controller 42 may adjust the transmittance of the optic device 28 to decrease the luminance of the image data 102 (154). Once the transmittance of the optic device 28 has been adjusted, the controller 42 may return to step 150. In this way, the controller 42 may iteratively adjust the exposure of the pixels to mitigate the flickering of the periodic light source 106 and adjust the transmittance or light absorption of the optic device 28 to prevent overexposure of the image data 102.

In step 152, if the saturation threshold is not exceeded, the controller may determine if the flickering is mitigated (156). If the flickering is not mitigated (e.g. limited below a threshold) in step 156, the controller 42 may return to step 150. If the flickering is mitigated in step 156, the controller 42 may continue to scan the image data 102 to identify if the one or more periodic light sources 106 are still detected in the image data 102 (158). If the periodic light source 106 is still identified in the image data 102, the controller 42 may return to step 150. If the periodic light source 106 is not still identified in the image data 102, the controller 42 may adjust the transmittance of the optic device 28 to be substantially clear such that the light entering the imager 54 is not significantly restricted (160). The controller 42 may also return to step 146 to set the exposure of the of the pixel array 30 based the environmental lighting conditions identified in the image data 102.

Figure 8:
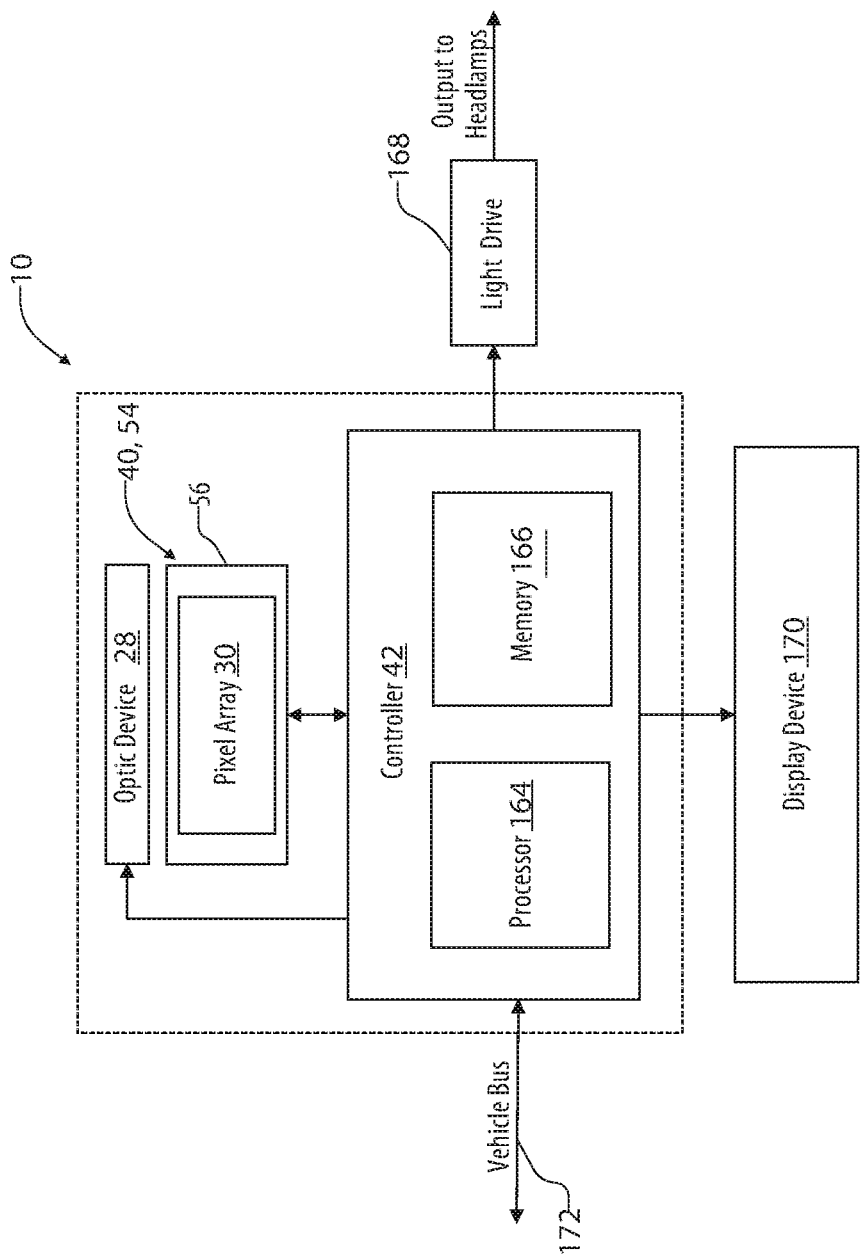
FIG. 8 is a block diagram of an imager module in accordance with the disclosure.

Referring now to FIG. 8, a block diagram of the imager module 10 is shown. As discussed herein, the imager module 10 may comprise the imager 54 in the form of the pixel array 30. The pixel array 30 may correspond to a CMOS image sensor, for example a CMOS active-pixel sensor (APS) or a charge coupled device (CCD). Each of the pixels of the pixel array 30 may correspond to a photo-sensor, an array of photo-sensors, or any grouping of sensors configured to capture light. Each of the photo-sensors may be operable to measure a pixel value in the pixel array 30. The controller 42 may comprise a processor 164 operable to process the image data 102 as supplied in analog or digital form from a readout circuit. For example, the controller 42 may be implemented as a plurality of processors, a multicore processor, or any combination of processors, circuits, and peripheral processing devices.

The controller 42 may further comprise a memory 166, which may correspond to a frame buffer. The memory 166 may correspond to various forms of memory, for example, random access memory (RAM), dynamic RAM (DRAM), synchronous DRAM (SDRAM), and other forms of memory configured to store digital information. Each of the memory cells may correspond to an addressable memory location in the imager memory and have a capacity corresponding to the resolution of each pixel of the pixel array 30.

The processor 164 may be configured to process the image data 102 and identify one or more periodic light sources 106. The processor 164 may further be operable to detect the brightness or intensity of the environmental light to adjust the exposure of one or more pixels of the pixel array 30. In this way, the controller 42 may be configured to mitigate the variations in the image data associated with the periodic light sources 106. Based on exposure required to mitigate the appearance of the periodic light sources 106 in the image data 102, the processor 164 may further output a control signal to the optic device 28 to control the transmittance of the electrochromic medium 46 (e.g. lighten or darken the optic device 28). In this way the controller 42 may adjust the exposure of the pixel array 30 to mitigate the flickering of the periodic light source 106 and adjust the transmittance or light absorption of the optic device 28 to prevent overexposure of the image data 102.

In some embodiments, the controller 42 may further be configured to control a headlight drive 168. The headlight drive 168 may be configured to control a light setting of one or more headlights of the vehicle. The controller 42 may also be in communication with a display device 170 configured to display the image data 102. The display device 170 may be disposed in a rearview mirror, for example an interior or exterior rearview mirror. In various embodiments, the display device 170 may be disposed in various portion of the vehicle, for example a center stack, gauge cluster, heads up display, etc. The display device 170 may be any suitable form of display, for example an LED, vacuum-fluorescent, or liquid crystal display LCD, organic LED (OLED).

In some embodiments, the controller 42 may be in communication with a vehicle bus 172. The vehicle bus 172 may be implemented using any suitable standard communication bus, such as a Controller Area Network (CAN) bus. The vehicle bus 172 may be configured to communicate a variety of vehicle operational and status information. Such operational information may be utilized by the controller 42 to control the imager circuit 40, the optic device 28 and various peripheral devices in communication with the controller 42.

For purposes of disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. An imager module for a vehicle comprising:
   an imager configured to capture image data over a plurality of image frames based on incoming light in a field of view;
   an electro-optic device configured to vary in transmittance controlling a transmission of the incoming light into the imager; and
   a controller in communication with the imager and the electro-optic device, wherein the controller is configured to:
   identify an exposure time for the imager based on environmental lighting conditions in the field of view;
   control the exposure time based on the environmental lighting conditions;
   identify a light source having a periodic activation;
   adjust the exposure time to an adjusted exposure based on a periodicity of the periodic activation; and
   control the transmittance of the electro-optic device controlling the average transmission of the incoming light, wherein the average transmission of the electro-optic device is maintained over a plurality of cycles of the periodic activation.

2. The module according to claim 1, wherein the electro-optic device comprises an electrochromic device configured to change in transmittance in response to an electrical potential applied by the controller.

3. The module according to claim 1, wherein the light source having the periodic activation is identified by identifying an object with a varying luminance over the plurality of image frames.

4. The module according to claim 3, wherein the object corresponds to a light source configured to illuminate periodically with a frequency greater than 30 Hz.

5. The module according to claim 1, wherein the controller is further configured to:
adjust the exposure time to the adjusted exposure based on the average transmission of the incoming light.

6. The module according to claim 5, wherein the adjusted exposure is temporally increased in response to the average transmission of the incoming light decreasing due to a decreased transmittance of the optic device.

7. The module according to claim 6, wherein the exposure time is temporally increased capturing the plurality of cycles and mitigating a lighting intensity fluctuation in the adjusted exposure relative to the exposure time.

8. An imager module for a vehicle comprising:
an imager configured to capture image data over a plurality of image frames based on incoming light in a field of view;
an optic device configured to control an average transmission of the incoming light into the imager over the plurality of image frames; and
a controller in communication with the imager and the optic device, wherein the controller is configured to:
identify an exposure time for the imager based on environmental lighting conditions in the field of view;
adjust the exposure time mitigating an appearance of a periodic light source in the image data; and
control a transmittance of the optic device controlling the average transmission of the incoming light, wherein the transmission of the optic device is maintained limiting the average luminance of the light entering the imager from exceeding a saturation threshold over the plurality of image frames.

9. The imager module according to claim 8, wherein the adjustment of the exposure time comprises extending the exposure time by a flicker mitigation period.

10. The imager module according to claim 9, wherein the controller controls the average transmission of the incoming light with the optic device commensurate to a ratio of the flicker mitigation period to the exposure time for the imager based on environmental lighting conditions.

11. The imager module according to claim 8, wherein the controller is configured to mitigate a variation in the appearance of the periodic light source in the image data by increasing the exposure time of a pixel of the imager.

12. The imager module according to claim 11, wherein the controller is configured to increase the exposure time of the pixel of the imager capturing an increased portion of a plurality of active periods of the periodic light source relative to the exposure identified based on the environmental lighting conditions.

13. The imager module according to claim 8, wherein the optic device corresponds to an electro-optic device configured to vary in transmittance in response to a control signal from the controller.

14. The imager module according to claim 13, wherein the electro-optic device comprises an electrochromic medium configured to adjust the transmittance in response to the control signal.

15. A method for capturing image data for a vehicle imaging system, the method comprising:
capturing image data in a field of view of an imager;
identifying an exposure time for the imager based on an environmental lighting condition in the field of view;
controlling an exposure time based on the environmental lighting conditions;
controlling a transmission of an electro-optic device controlling a transmission of the environmental light transmitted through the electro-optic device; and
extending the exposure time by controlling the average transmission of the light entering the imager, wherein the transmission of the optic device is maintained over a plurality of continuous image frames limiting the average luminance of a plurality of pixels of the imager from exceeding a saturation threshold.

16. The method according to claim 15, further comprising:
identifying a flickering light source in the image data.

17. The method according to claim 16, further comprising:
identifying a minimum exposure time based on a frequency of the flickering light source.

18. The method according to claim 17, wherein the exposure time is extended to an extended exposure time based on the minimum exposure time.

19. The method according to claim 17, wherein the frequency of the flickering light source is identified based on a variation in a luminance value of an object in the image data over the plurality of image frames.

* * * * *